US012561609B2

(12) United States Patent
Liu et al.

(10) Patent No.: US 12,561,609 B2
(45) Date of Patent: Feb. 24, 2026

(54) FEDERATED LEARNING METHOD FOR *k-means* CLUSTERING ALGORITHM

(71) Applicant: ZHEJIANG UNIVERSITY, Hangzhou (CN)

(72) Inventors: Jian Liu, Hangzhou (CN); ZhiHua Tian, Hangzhou (CN); Rui Zhang, Hangzhou (CN); Xiaoyang Hou, Hangzhou (CN); Kui Ren, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 878 days.

(21) Appl. No.: 17/860,128

(22) Filed: Jul. 8, 2022

(65) Prior Publication Data

US 2022/0358417 A1      Nov. 10, 2022

Related U.S. Application Data

(63) Continuation of application No. PCT/CN2021/091045, filed on Apr. 29, 2021.

(51) Int. Cl.
G06F 18/23213 (2023.01)
G06N 20/00 (2019.01)

(52) U.S. Cl.
CPC ....... G06N 20/00 (2019.01); G06F 18/23213 (2023.01)

(58) Field of Classification Search
CPC .......................... G06F 18/23213; G06N 20/00
See application file for complete search history.

(56) References Cited

U.S. PATENT DOCUMENTS

| | | | | |
|---|---|---|---|---|
| 7,590,642 | B2 * | 9/2009 | Campos | ............ G06F 18/23213 707/999.102 |
| 2022/0269977 | A1 * | 8/2022 | Yu | ......................... G06N 20/00 |

(Continued)

FOREIGN PATENT DOCUMENTS

| | | |
|---|---|---|
| CN | 110782042 A | 2/2020 |
| CN | 112364943 A | 2/2021 |

(Continued)

OTHER PUBLICATIONS

International Search Report (PCT/CN2021/091045); Date of Mailing: Jan. 10, 2022.

*Primary Examiner* — Beau D Spratt
(74) *Attorney, Agent, or Firm* — Wiersch Law Group

(57) ABSTRACT

Disclosed is a federated learning method for a k-means clustering algorithm. Horizontal federated learning includes the following steps: 1) initializing K clusters, and distributing, a local sample to a cluster closest to the sample; 2) calculating a new cluster center of the cluster; and 3) if the cluster center changes, then returning to step 1). Vertical federated learning includes the following steps: 1) running, the k-means clustering algorithm locally to obtain T local clusters and intersecting to obtain $T^L$ new clusters, or running an AP clustering algorithm to obtain $T_i$ clusters and intersecting to obtain $\Pi_{i=1}^{L}T_i$ new clusters; 2) taking $T^L$ ($\Pi_{i=1}^{L}T_i$) new cluster centers as input samples, and initializing the K clusters; 3) distributing each sample to the cluster closest to the sample; 4) calculating a new cluster center of the cluster; and 5) if the cluster center changes, then returning to step 3).

1 Claim, 3 Drawing Sheets

(56)          References Cited

U.S. PATENT DOCUMENTS

| | | | |
|---|---|---|---|
| 2022/0383091 A1* | 12/2022 | Das ........................ | G06N 3/045 |
| 2023/0409983 A1* | 12/2023 | Aradhyula ............. | G06N 3/045 |

FOREIGN PATENT DOCUMENTS

| | | |
|---|---|---|
| CN | 112487481 A | 3/2021 |
| CN | 112633409 A | 4/2021 |

* cited by examiner

FEDERATED LEARNING METHOD FOR
k-means CLUSTERING ALGORITHM

CROSS-REFERENCE TO RELATED APPLICATIONS

The present application is a continuation of International Application No. PCT/CN2021/091045, filed on Apr. 29, 2021, the content of which is incorporated herein by reference in its entirety.

TECHNICAL FIELD

The present disclosure relates to the field of federated learning, in particular to a federated learning method for a k-means clustering algorithm.

BACKGROUND

Federated learning, also known as ensemble learning, is a machine learning technology that jointly trains models on a plurality of decentralized devices or servers that store data. Unlike traditional centralized learning, this method does not need to merge data together, so the data exist independently. The concept of federated learning was first proposed by Google in 2017 (Brendan McMahan, Eider Moore, Daniel Ramage, SethHampson, and Blaise Aguera y Arcas. Communication-efficient learning of deep networks from decentralized data. In Aarti Singh and Jerry Zhu, editors, Proceedings of the 20th International Conference on Artificial Intelli-gence and Statistics, volume 54, pages 1273-1282, Fort Lauderdale, FL, USA, 20-22 Apr. 2017. PMLR.), and nowadays, it has been greatly developed, and the application scenarios are becoming more and more extensive. According to different ways of data division, federated learning is mainly divided into vertical federated learning and horizontal federated learning. In vertical federated learning, researchers distribute a training process of a neural network across a plurality of participants, iteratively aggregating locally trained models into a joint global model. In this process, there are mainly two roles: a central server and the plurality of participants. At the beginning of training, the central server initializes the model and sends it to all the participants. During each iteration, each participant trains the received model with local data and sends a training gradient to the central server. The central server aggregates the received gradient to update the global model. Benefiting from this way of transmitting intermediate results instead of raw data, federated learning has the following advantages: (1) privacy preservation: in the training process, the data are still kept on a local device; (2) low latency: the updated model may be used for a user to predict on the devices; and (3) computational burden reduction: the training process is distributed on the plurality of devices instead of being borne by one device.

Although federated learning has become one of the current research centers in the scientific field, the application of a clustering algorithm to federated learning scenarios is still missing.

SUMMARY

In view of the shortcomings in the prior art, an objective of the present disclosure is to provide a federated learning method for a k-means clustering algorithm, and the method utilizes a secure aggregation algorithm, so that a classical clustering algorithm k-means can be applied to fields of horizontal federated learning and vertical federated learning. Moreover, the algorithm in the present disclosure makes a communication volume between different participants independent of a size of databases, the algorithm complexity is $O(t)$, and t is a constant. Therefore, in a large-scale application scenario, the present disclosure also has practical values.

An objective of the present disclosure is achieved by the following technical solution: a federated learning method for a k-means clustering algorithm, the method mainly includes two parts, vertical federated learning and horizontal federated learning.

The horizontal federated learning includes the following steps:

(1.1) initializing K cluster centers and sending the K cluster centers to all participants: each participant is a database with same characteristics and different samples, and all the participants together constitute a total database; each sample refers to a piece of data in the database;

(1.2) calculating a square of a Euclidean distance between each sample of all the participants and the cluster centers respectively, finding the cluster center with the smallest square of the Euclidean distance for each sample, and distributing the samples into a cluster corresponding to the cluster center; and (1.3) counting the quantity of the samples and a sum of samples of each cluster in the participants locally, and then calculating the quantity of samples, a sum of the samples, and an average value of each cluster in the total database by using a secure aggregation method, taking the average value obtained by calculation as a new cluster center of each cluster; if the new cluster centers are different from original cluster centers and a count of iterations is less than a set count, then returning to step (1.2), and increasing the count of iterations by one; the sum of the samples refers to corresponding summation of several pieces of data corresponding to the samples according to the characteristics, without changing a dimension of the samples.

The vertical federated learning includes the following steps:

(2.1) each participant being the database with the same samples and different characteristics, all the participants together constituting the total database, each sample in each participant refers to a piece of data in the database; running, by L participants respectively, the k-means clustering algorithm locally to obtain T local clusters and corresponding centers of the participants and sending, by each participant, labels of samples in the T clusters and corresponding cluster labels to the last participant, or running, by L participants respectively, an AP clustering algorithm locally to obtain some local clusters and corresponding centers of the participants, determining the quantity of the clusters by the algorithm and denoting as $T_i$; and then sending, by each participant, labels of the samples in the clusters and corresponding center labels to the last participant;

(2.2) in the last participant, intersecting the clusters obtained by each participant to obtain $T^L(\Pi_{i=1}^{L}T_i)$ new clusters, sending $T^L(\Pi_{i=1}^{L}T_i)$ new cluster results, namely a new cluster label to which each sample belongs, to all the participants, calculating the quantity of the samples, a sum of the samples and an average value of each cluster on each participant, and taking the average value obtained by calculation as a cluster center of each cluster on the characteristics held by the current participant, so as to obtain cluster centers of the $T^L(\Pi_{i=1}^{L} T_i)$ clusters, at the moment, the characteristics of the cluster centers being all stored on different participants; the sum of the samples refers to corresponding summation of several pieces of data corresponding to the samples according to the characteristics, without changing the dimension of the samples;

(2.3) taking the $T^L(\Pi_{i=1}^{L} T_i)$ new cluster centers as a new database, the samples being all samples in the new database, and at the same time, taking the quantity of the samples in the $T^L(\Pi_{i=1}^{L} T_i)$ clusters as a weight, and initializing the K clusters and K cluster centers thereof;

(2.4) calculating a square of a Euclidean distance of each sample to a corresponding characteristic of each cluster center stored in the current participant in each participant, and then calculating the square of the Euclidean distance between each sample and the cluster center by using secure aggregation, and taking a cluster corresponding to the cluster center with the smallest square of the Euclidean distance from an input sample as a cluster to which the sample belongs; and $$\text{calculating a weighted average value} = \frac{\sum_{x \text{ is samples in cluster}} \text{weight of } x \cdot x}{\text{Quantity of samples in cluster}} \quad (2.5)$$

of the corresponding characteristic of each cluster on different participants, taking it as the corresponding characteristic of each new cluster center, and if the new cluster centers are different from the original cluster centers and a count of iterations is less than a set count, then returning to step (2.4).

The present disclosure has the beneficial effects as follows:

(1) The communication volume of the method of the present disclosure is O(t), t is a constant, and the communication volume is independent of the size of the databases, and is very efficient in the large-scale application scenario.

(2) The secure aggregation algorithm is used in all communication processes to protect local data, and only the labels of the cluster results are transmitted in vertical federated learning, so that the privacy of different participants is guaranteed.

DESCRIPTION OF EMBODIMENTS

A core technology of the present disclosure is that under the condition of federated learning of horizontal segmentation and vertical segmentation, through a secure aggregation algorithm (Keith Bonawitz, Vladimir Ivanov, Ben Kreuter, Antonio Marcedone, H Brendan McMahan, Sarvar Patel, Daniel Ramage, Aaron Segal, and Karn Seth. 2017. Practical secure aggregation for privacy-preserving machine learning. In Proceedings of the 2017 ACM SIGSAC Conference on Computer and Communications Security. ACM, 1175-

1191), calculation involving different participants in a k-means algorithm (S. Lloyd. 1982. Least squares quantization in PCM. IEEE Transactions on Information Theory 28, 2 (1982), 129-137) is replaced. In order to obtain a clearer and more complete description of the method, the method is described below with reference to specific examples.

Figure 1:
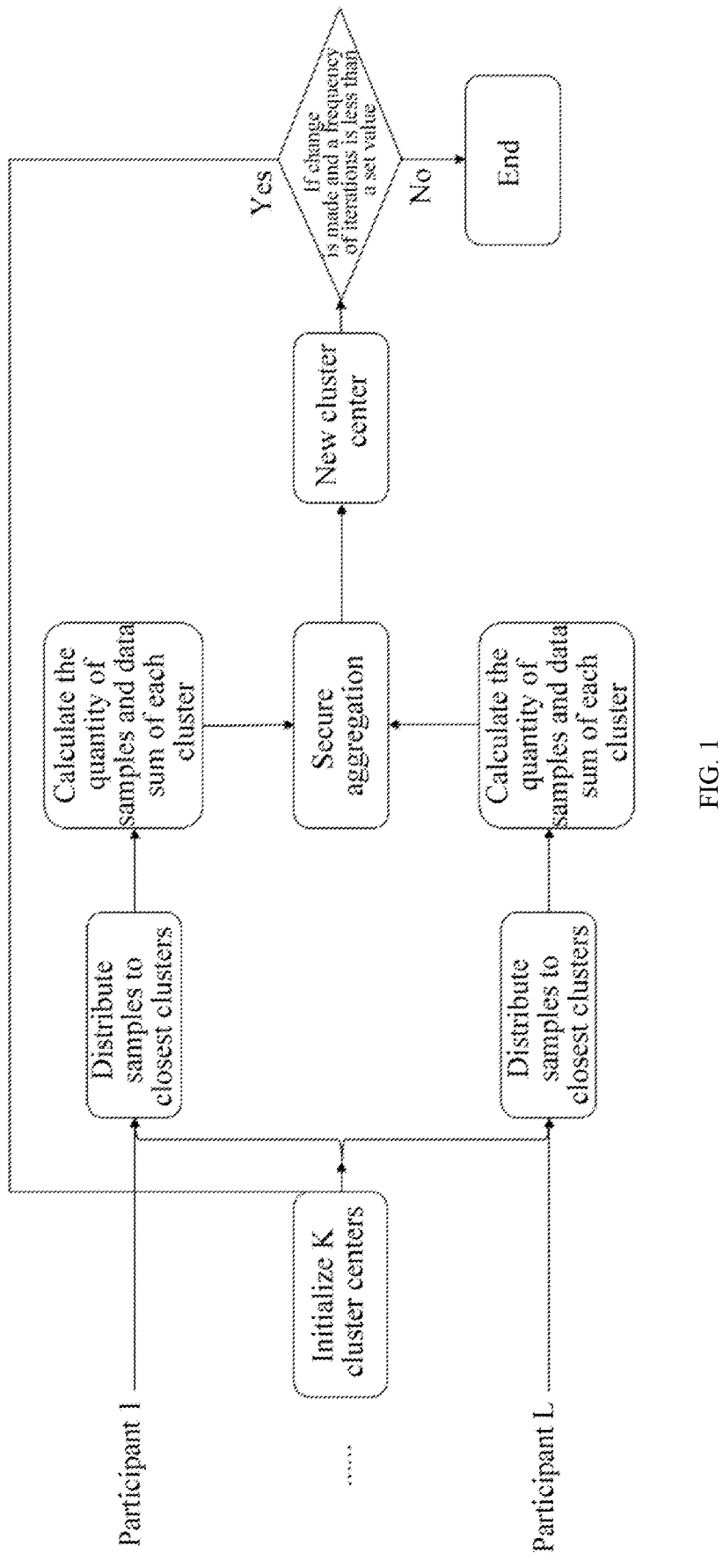
FIG. 1 is a flowchart corresponding to horizontal federated learning.

FIG. 1 is a flowchart corresponding to horizontal federated learning included in the method. The method specifically includes the following steps:

for the horizontal federated learning:

There are three participating banks in an example, and each bank has two different users. The three banks all hold income and age data of their users, two users of a certain bank and their incomes and ages constitute a database of the bank, and the three banks constitute a total database. Finally, two clusters C1 and C2 are needed, and corresponding cluster centers are c1 and c2. The banks are participants, the users are samples, and the incomes and the ages are two characteristics.

(1.1) Two cluster centers $c1=(c1_x, c1_y)$ and $c2=(c2_x, c2_y)$ are randomly initialized, the two cluster centers are two-dimensional arrays, and the two cluster centers are sent to all participating banks.

(1.2) Squares of Euclidean distances between six pieces of user data and the cluster centers are calculated respectively, and for each user, the cluster center closer to the user is found, and distributed to the cluster C1 and the cluster C2. Specifically, for the user I, distances from the user I to c1 and c2 are calculated respectively, $d1=(I_x-C1_x)^2+(I_y-C1_y)^2$, $d2=(I_x-C2_x)^2+(I_y-C2_y)^2$, where features x and y are income and age; and $I_x$, $I_y$ are corresponding data of the user I under the feature x and the feature y, that is, the income and age of the user I. If the smallest of d1 and d2 is d1, then the user I belongs to the cluster C1.

(1.3) If the first bank has users I and J which belong to the cluster C1, a user K of the second bank belongs to the cluster C1, and users of the third bank do not belong to the cluster C1, then an income sum $S1=I_x+J_x$ and an age sum $A1=I_y+J_y$ of the users I and J, and the quantity 2 of users belonging to the cluster C1 are calculated locally in the first bank, the second bank has only one user belonging to the cluster C1, so its income sum is $S2=K_x$, and its age sum is $A2=K_y$. Then through the two income sums S1 and S2, the two age sums A1 and A2, and two user quantities 2 and 1 of the users belonging to the cluster C1 provided by the first and second banks, a secure aggregation algorithm is used to calculate an income sum S=S1+S2 and an age sum K=K1+K2 of the users belonging to the cluster C1 among all the users, calculate the quantity N=2+1 of the samples input into the cluster C1, divide the quantity of the samples by the income sum and the age sum respectively, obtain an average value of income and an average value of age, and take it as a new cluster center c1 of the cluster C1. Similarly, a new cluster center c2 of the cluster C2 is calculated. If the new cluster centers are different from original cluster centers and a count of iterations is less than a set count, then the step (1.2) is returned, and the count of iterations is increased by one.

Figure 2:
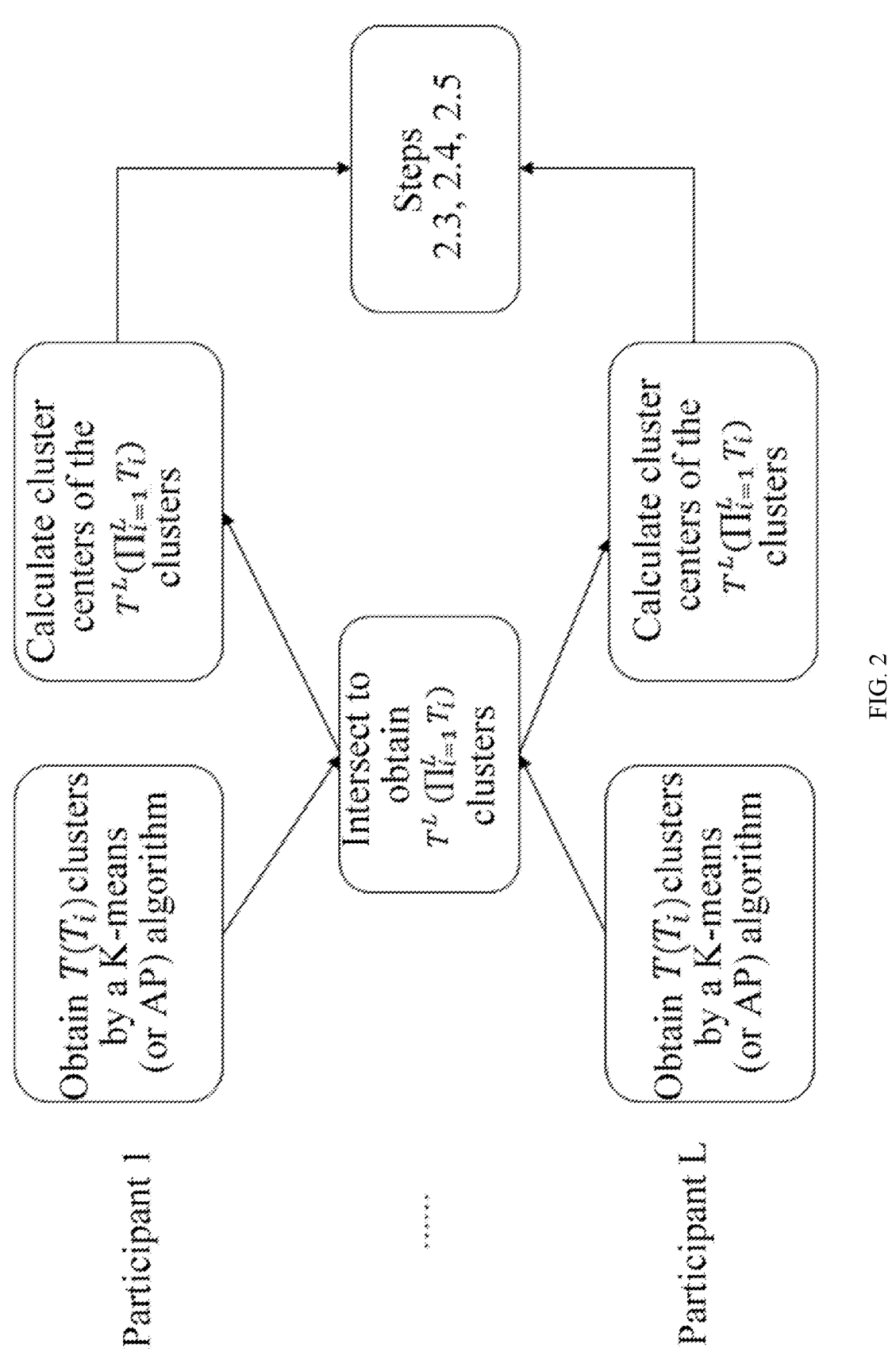
FIG. 2 is a flowchart corresponding to steps (2.1) and (2.2) of vertical federated learning.
Figure 3:
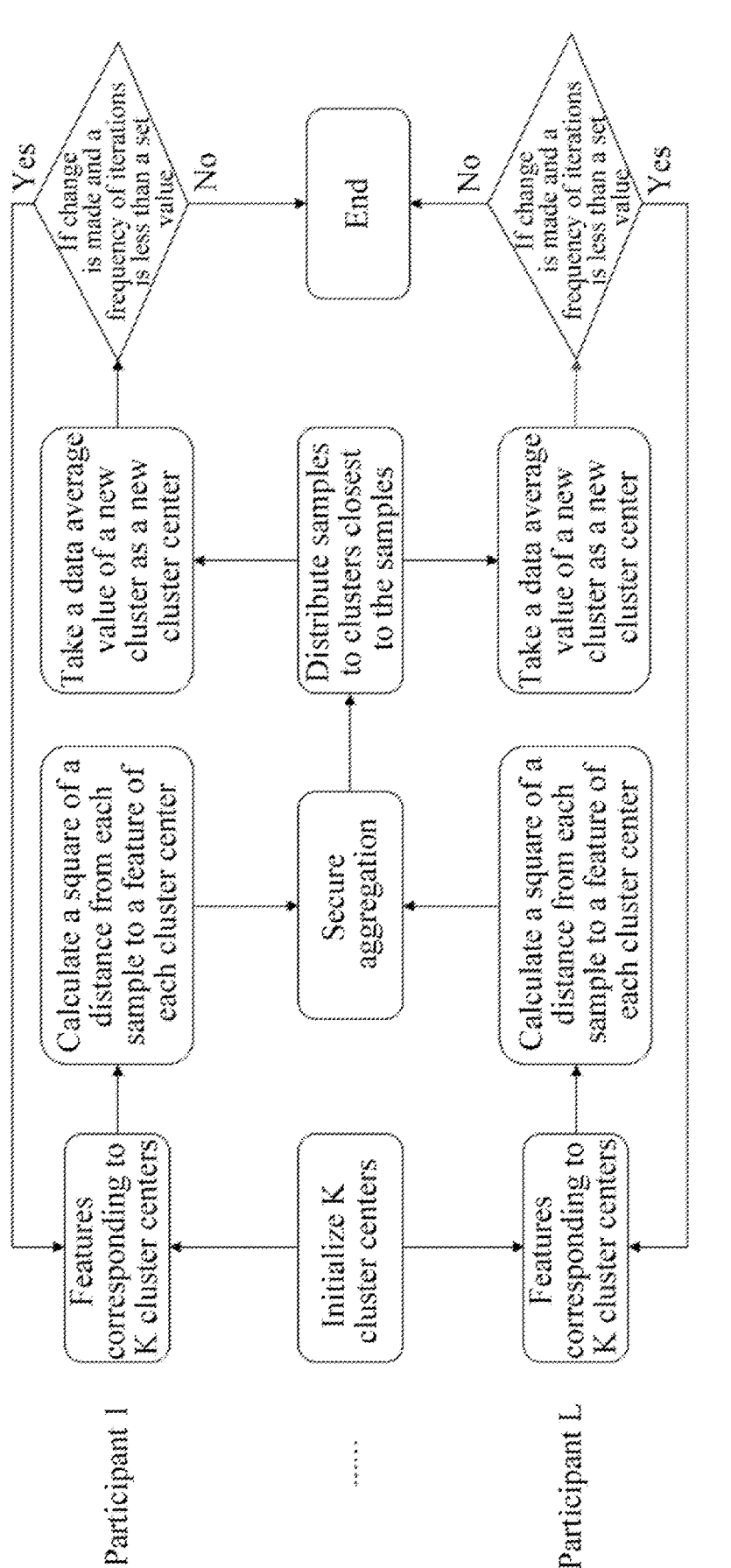
FIG. 3 is a flowchart corresponding to steps (2.3), (2.4) and (2.5) of vertical federated learning.

FIG. 2 is a flowchart corresponding to steps (2.1) and (2.2) of vertical federated learning; and FIG. 3 is a flowchart corresponding to steps (2.3), (2.4) and (2.5) of vertical federated learning. The method includes the following steps:

There are two banks in an example, the two banks share the same ten users, and the ten users are uniquely identified as 1, 2, 3, . . . , 9, 0. The two banks hold data corresponding to the incomes and ages of all users respectively. Finally, two clusters C1 and C2 are needed, and corresponding cluster centers are c1 and c2. The first bank holds all users and their incomes as a database of the first bank, the second bank holds all users and their ages as a database of the second bank, and the two banks constitute the total database. The banks are the participants, the users are the samples, and incomes and ages are two characteristics, which are denoted as a feature x and a feature y.

(2.1) The two banks respectively run the k-means clustering algorithm locally, and obtain two clusters: A and B, and the corresponding cluster centers: a center A and a center B. The users in the clusters A and B in the first bank and the clusters corresponding to the users are sent to the second bank in a form of serial numbers, or the two banks respectively run an AP clustering algorithm locally, the first bank obtains two clusters: A and B, and the corresponding cluster centers: a center A and a center B, and the second bank obtains two clusters: A and B, and the corresponding cluster centers: a center A and a center B as well.

(2.2) For the first bank, A includes users 1, 2, 3, 4, and 5, and B includes users 6, 7, 8, 9, and 0. For the second bank, A includes users 1, 3, 5, 7, and 9, and B includes users 2, 4, 6, 8, and 0. In the second bank, a cluster result of the first bank and a cluster result of the second bank are intersected, and 4 new clusters are obtained: a cluster AA including users 1, 3, and 5, a cluster AB including user 2 and 4, a cluster BA including users 7 and 9, and a cluster BB including users 6, 8, and 0. The 4 new clusters are transmitted to all other banks, the first bank herein. Then cluster centers of the four newly obtained clusters are calculated, the cluster AA is taken as an example, in the first bank, an average value of a center AA under the feature x is calculated, that is, an average income of users in the cluster AA, $$\text{center } AA_x = \frac{1_x + 3_x + 5_x}{3},$$

the second bank, and an average value of the center AA under the feature y is calculated, that is, an average age of the users in the cluster AA, $$\text{center } AA_y = \frac{1_y + 3_y + 5_y}{3}.$$

Then the cluster center of the cluster AA is (center $AA_x$, center $AA_y$). At this time, center $AA_x$ is stored in the first bank, and center $AA_y$ is stored in the second bank.

(2.3) The newly obtained 4 cluster centers are taken as 4 samples in a new third bank: AA, AB, BA, and BB, the quantities of users in the 4 clusters are taken as weights of the 4 samples, and in this example, the weights are 3, 2, 2, and 3 respectively. The two clusters C1 and C2 and cluster centers c1 and c2 thereof are Initialized.

(2.4) In the first bank, squares of the Euclidean distances from the four samples to the first feature: income of the two cluster centers c1 and c2 are calculated, the sample AA is taken as an example, $d1_{xAA}=(\text{center } AA_x - c1_x)^2$, and $d2_{xAA}=(\text{center } AA_x - c2_x)^2$. In the second bank, squares of the Euclidean distances from the four samples to the second feature: age of the two cluster centers c1 and c2 are calculated similarly, the sample AA is taken as an example, $d1_{yAA}=(\text{center } AA_y - c1_y)^2$, and $d2_{yAA}=(\text{center } AA_y - c2_y)^2$. Then the secure aggregation algorithm is used to calculate the squares of the Euclidean distances between the four input samples and the two cluster centers c1 and c2 respectively, the sample AA is still taken as an example, $d1_{AA}=(d1_{xAA}+d1_{yAA})^2$, and $d2_{AA}=(d2_{xAA}+d2_{yAA})^2$. For each input sample, the cluster center with the smallest square of the Euclidean distance from the input sample is find and taken as a cluster to which the sample belongs, and for the sample AA, if $d1_{AA}$ is smaller, then the sample AA is distributed to the cluster C1.

(2.5) If the cluster C1 includes the sample AA and the sample BB, since the sample AA includes 3 users and the sample BB also includes 3 users, an average value of the sample AA and the sample BB under the feature x of the cluster C1 is calculated in the first bank 1, that is, an average value of sample incomes in the cluster C1 is $$\frac{3 \times AA_x + 3 \times BB_x}{3 + 3}.$$

An average value of the input sample AA and the input sample BB under the feature y of the cluster C1 is calculated in the second bank, that is, an average value of sample ages in the cluster C1 is $$\frac{3 \times AA_y + 3 \times BB_y}{3 + 3} \cdot \left( \frac{3 \times AA_x + 3 \times BB_x}{3 + 3}, \frac{3 \times AA_y + 3 \times BB_y}{3 + 3} \right)$$

is taken as a new cluster center c1 of C1. Similarly, a new cluster center c2 of cluster C2 is calculated. If the new cluster centers are different from the original cluster centers and a count of iterations is less than a set count, step (4) is returned.

The comparison between the measured accuracy and the accuracy of the k-means algorithm on three disclosed datasets when T takes different values using the present method is shown in Table 1 below:

TABLE 1

| T | Breast Cancer (K = 2) | HIGGS (K = 2) | Pen Digits (K = 10) |
| --- | --- | --- | --- |
| K | 0.9279 | 0.5299 | 0.6530 |
| 2K | 0.9213 | 0.5299 | 0.6760 |
| 4K | 0.9255 | 0.5299 | 0.6982 |
| 6K | 0.9251 | 0.5299 | 0.7092 |
| 8K | 0.9265 | 0.5299 | 0.7314 |
| k-means | 0.9568 | 0.5299 | 0.6513 |

It can be seen from Table 1 above that when T takes different values, the accuracy of the federated learning method (vertical FederMeans and horizontal FederMeans) for the k-means clustering algorithm and running results of the k-means algorithm as a baseline method are compared. Brest Cancer is a binary dataset for breast cancer detection, which includes 569 samples, and each sample has 29 features. HIGGS is a binary dataset of Higgs Bose words, which includes 11,000,000 samples, and each sample has 28 features. PenDigits is a dataset of handwritten digits, which includes 10992 samples, each sample has 16 features, and the dataset has 10 clusters. Here, the horizontal federated learning part of this algorithm is exactly the same as that of the k-means clustering algorithm. The result shows that the accuracy of the federated learning method has reached the same level as the k-means clustering algorithm, and the federated learning method has practical values.

The comparison between the running time of the present method and the running time of the k-means algorithm on a test result of the three disclosed datasets is shown in Table 2 below.

TABLE 2

| T | Breast Cancer (K = 2) | HIGGS (K = 2) | Pen Digits (K = 10) |
|---|---|---|---|
| K | 0.088198 | 216.997 | 1.265712 |
| 2K | 0.135942 | 230.722 | 2.511396 |
| 4K | 0.158319 | 283.529 | 3.263794 |
| 6K | 0.239181 | 347.021 | 5.000932 |
| 8K | 0.324137 | 596.552 | 6.46223 |
| horizontal FederMeans | 0.4886642 | 79.2643 | 0.9453768 |
| k-means | 0.0169984 | 351.8916 | 0.42467761 |

It can be seen from Table 2 above that the horizontal federated learning part of the method consumes less time on large datasets, the vertical federated learning part is also similar to the k-means clustering algorithm, and the method has application values.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

Obviously, the above embodiments are only examples for clearly illustrating, rather than limiting the implementations. For those ordinarily skilled in the art, changes or modifications in other different forms may also be made on the basis of the above description. All implementations need not and cannot be exhaustive here. However, the obvious changes or changes derived from this are still within the protection scope of the present disclosure.

What is claimed is:

1. A federated learning method for a k-means clustering algorithm, applied to distributed clustering scenarios of user data among banks, wherein the method mainly comprises two parts, vertical federated learning and horizontal federated learning;

participants are banks holding user data, samples are bank users, and features of the samples include users' income and age;

the horizontal federated learning comprises the following steps:

(i) initializing K cluster centers, wherein the cluster centers are two-dimensional arrays containing income and age dimensions, and sending the K cluster centers to all banks holding user data, wherein each participant is a database with same income and age and different bank users, and all the banks holding user data together constitute a total database; each sample refers to a piece of data in the database;

(ii) calculating a square of a Euclidean distance between each sample of all the banks holding user data and the cluster centers, respectively, finding the cluster center with the smallest square of the Euclidean distance for each bank user, and distributing the bank users into a cluster corresponding to the cluster center; and (iii) counting a quantity of the bank users and a sum of incomes, a sum of ages, and a sum of bank users of each cluster in the banks holding user data locally, and then calculating the quantity of samples, a total sum of incomes, a total sum of ages of each cluster in the total database by using a secure aggregation method, taking the average value obtained by calculation as a new cluster center of each cluster; an income dimension of the new cluster center is the total sum of incomes/quantity of samples), and an age dimension is the total sum of ages/total quantity of samples); if the new cluster centers are different from original cluster centers and a count of iterations is less than a set count, then returning to step (ii), and increasing the count of iterations by one; wherein the sum of the samples refers to corresponding summation of several pieces of data corresponding to the samples according to the characteristics, without changing a dimension of the samples; and the vertical federated learning comprises the following steps:

(iv) each bank holding user data being the database with the same bank users and different characteristics, all the banks holding user data together constituting the total database, wherein each sample in each bank holding user data refers to a piece of data in the database; running, by L banks holding user data respectively, the k-means clustering algorithm locally to obtain T local clusters and corresponding centers of the banks holding user data and sending, by each bank holding user data, labels of bank users in the T clusters and corresponding cluster labels to the last bank holding user data, or running, by L banks holding user data, respectively, an AP clustering algorithm locally to obtain some local clusters and corresponding centers of the banks holding user data, determining the quantity of the clusters by the algorithm and denoting as $T_i$; and then sending, by each bank holding user data, labels of the bank users in the clusters and corresponding center labels to the last bank holding user data;

(v) in the last bank holding user data, intersecting the clusters obtained by each bank holding user data to obtain $T^L$ or $\Pi_{i=1}^{L}T_i$ new clusters, sending $T^L$ or $\Pi_{i=1}^{L}T_i$ new cluster results, namely a new cluster label to which each bank user belongs, to all the banks holding user data, calculating the quantity of the bank users, a sum of the features and an average value of each cluster on each bank holding user data, under the features held locally by each bank holding user data, and taking the average value obtained by calculation as a cluster center of each cluster on the characteristics held by the current bank holding user data, so as to obtain cluster centers of the $T^L$ or $\Pi_{i=1}^{L}T_i$ clusters, wherein at the moment, the characteristics of the cluster centers being all stored on different banks holding user data, and wherein the sum of the sample refers to corresponding summation of several pieces of data corresponding to the samples according to the characteristics, without changing the dimension of the samples;

(vi) taking the $T^L$ or $\Pi_{i=1}^{L}T_i$ new cluster centers as a new database, the bank users being all bank users in the new database, and at the same time, taking the quantity of the bank users in the $T^L$ or $\Pi_{i=1}^{L}T_i$ clusters as a weight, and initializing the K clusters and K cluster centers thereof;

(vii) calculating a square of a Euclidean distance of each sample to a corresponding characteristic of each cluster center stored in the current bank holding user data in each bank holding user data, and then calculating the square of the Euclidean distance between each sample and the cluster center by using secure aggregation, and taking a cluster corresponding to the cluster center with the smallest square of the Euclidean distance from an input sample as a cluster to which the sample belongs; and (viii)

calculating a weighted average value =

$$\frac{\sum_{x \text{ is samples in cluster}} \text{weight of } x \cdot x}{\text{Quantity of samples in cluster}}$$

of the corresponding characteristic of each cluster on different banks holding user data banks holding user data, taking it as the corresponding characteristic of each new cluster center, and if the new cluster centers are different from the original cluster centers and a count of iterations is less than a set count, then returning to step (vii).

* * * * *